Aug. 25, 1964  H. WALKER  3,146,391
GENERATION OF HIGH VOLTAGE HEAVY CURRENT PULSES
Filed Jan. 8, 1959
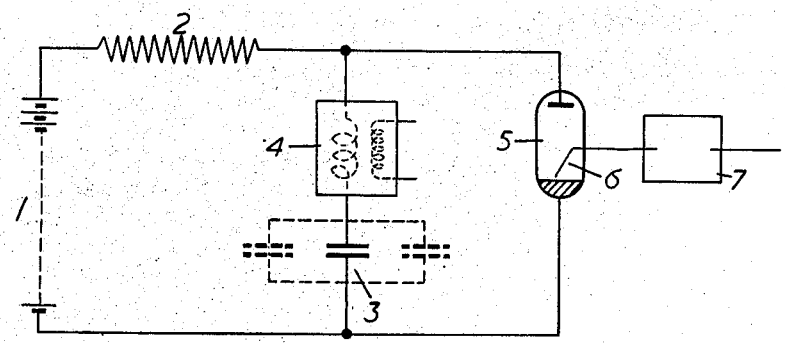
Inventor
Herbert Walker
By
his Attorneys 3,146,391
GENERATION OF HIGH VOLTAGE HEAVY
CURRENT PULSES
Herbert Walker, Helsby, near Warrington, England, assignor to British Insulated Callender's Cables Limited, London, England, a British company
Filed Jan. 8, 1959, Ser. No. 785,750
Claims priority, application Great Britain Jan. 14, 1958
5 Claims. (Cl. 320—1)

This invention relates to the regular and repeated generation of high voltage heavy current pulses by alternately slowly charging a capacitor or a bank of capacitors connected from a source of direct current supply to a peak voltage and rapidly discharging the capacitor or the bank of capacitors.

For this purpose capacitors built up of paper insulated elements which are vacuum dried and impregnated with an insulating liquid, usually mineral insulating oil or chlorinated diphenyl, have been proposed.

For economical reasons it is necessary for heavy current pulse generation purposes to operate the capacitors at a high electrical stress yet they must at the same time be capable of withstanding repeated cycles of charging and discharging over long periods.

By the term "heavy current pulse" we mean current pulses developed from capacitors having volume efficiencies of at least 85 joules/litre, and by the term "high electrical stress" we mean an electrical stress of at least 85 volts/$\mu$.

We have now discovered that, for the generation of high voltage heavy current pulses, capacitors built up of kraft paper insulated elements impregnated with castor oil are far superior to those impregnated with mineral insulating oils or with chlorinated diphenyls. This discovery is surprising as castor oil has not been favourably regarded as a capacitor impregnant by capacitor manufacturers for such applications.

In accordance with the present invention we take advantage of this discovery to provide an improved method of generating high voltage heavy current pulses, which comprises alternately slowly charging a castor oil impregnated kraft paper insulated capacitor or the units of a bank of such capacitors from a source of direct current supply to a peak voltage at which the capacitors are subjected to a high electrical stress and rapidly discharging the capacitor or the bank of capacitors.

The invention also resides in apparatus for carrying out this method of regular and repetitive pulse generation which apparatus comprises a high voltage source of direct current supply, a castor oil impregnated kraft paper insulated capacitor, or a bank of such capacitors, means for feeding direct current of appropriate voltage to said capacitor or capacitors to charge it or them over periods varying from 2 seconds to 2 minutes to a peak voltage at which it or they are subjected to a high electrical stress and means permitting said capacitor or capacitors to discharge during intervals ranging from 10 milliseconds to 1 microsecond on becoming charged to said peak voltage. This regular charge/discharge duty cycle may be continuous up to $10^6$ cycles.

We have found that the capacitor or capacitors can be repetitively charged to a peak voltage such that the dielectric is peak stressed to a value as high as 130 volts/$\mu$.

The superiority of our improved method and apparatus over known methods is clearly indicated by the following test results giving the respective lives of three kraft paper insulated capacitors of similar construction but impregnated with different impregnating liquids:

| Sample No. | Stress, v./$\mu$ | Impregnant | Average life in cycles |
|---|---|---|---|
| 1, 2, 3 | 100 | Hydrocarbon oil | $2.4 \times 10^5$ |
| 4, 5, 6 | 100 | Chlorinated Diphenyl | $6.9 \times 10^5$ |
| 7, 8, 9, 10, 11 | 100 | Castor oil | $>3.2 \times 10^6$ |

It will be seen that apparatus used for pulse generation in accordance with the invention has a minimum life of from 5 to 10 times that of apparatus used in known methods.

The accompanying drawing represents diagrammatically, and by way of example, one form of the apparatus with which the invention is concerned. Across a series circuit comprising a high voltage direct current source 1 and a current limiting resistor 2 there is connected a capacitor circuit comprising a capacitor 3 in series with a load 4 which, for the purpose of illustration, is represented as the primary winding of a step-up transformer. Across the ends of the capacitor circuit there is connected a trigger-controlled spark gap, represented for the purpose of illustration as an ignitron 5 with an igniting electrode 6 to which can be applied an appropriate triggering voltage from a controller 7. Some form of switch may be incorporated in the connection between the capacitor 3 and the D.C. source 1. In accordance with the invention, the capacitor 3 is formed with a dielectric of kraft paper impregnated with castor oil. When the circuit is complete from the D.C. source 1 to the capacitor 3, the latter is charged to the D.C. voltage in a period of time which is determined by the characteristics of the series circuit which includes the limiting resistor 2 and the capacitor. When the capacitor is charged the spark gap can be triggered by the application of an appropriate voltage pulse from the controller 7 to the igniting electrode 6 to provide a discharge circuit for the capacitor. The discharge will produce a high current pulse through the load 4, which in the instance shown will produce a high voltage pulse at the transformer output terminals. As indicated in broken line, the capacitor 3 may be replaced by a capacitor bank consisting of a number of parallel-connected unit capacitors. Alternatively the capacitor may be replaced by a series or series-parallel connected group of unit capacitors. It will be appreciated that the exact nature of the load 4 and of the trigger-controlled spark-gap, including the igniting arrangements, will depend upon the particular requirements of the circumstances in which the device is to be used, for instance upon the discharge intensity and the frequency of discharge.

What I claim as my invention is:
1. An impulse generator comprising an electric capacitor of which the conductive elements are insulated with kraft paper impregnated with castor oil, means for regularly and repeatedly feeding direct current from a high voltage source to charge the capacitor in a period in the range 2 seconds to 2 minutes to a peak voltage at which the capacitor insulation is subjected to an electrical stress of at least 85 volts per micron, and means for regularly and repeatedly permitting the capacitor to discharge rapidly on becoming charged to the peak voltage.

2. An impulse generator comprising a bank of more one electric capacitor of which the conductive elements are insulated with kraft paper impregnated with castor oil, means for regularly and repeatedly feeding direct current from a high voltage source to charge each capacitor in a period in the range 2 seconds to 2 minutes to a peak voltage at which the capacitor insulation is subjected to an electrical stress of at least 85 volts per micron, and means for regularly and repeatedly permitting the bank of capacitors to discharge rapidly on each capacitor becoming charged to the peak voltage.

3. A method of regularly and repeatedly generating a high voltage heavy current impulse, comprising alternately slowly charging a castor oil impregnated kraft paper insulated electrical capacitor in a period in the range of 2 seconds to 2 minutes, from a source of direct current supply, to a peak voltage at which the insulation of the capacitor is subjected to an electrical stress of at least 85 volts per micron, and thereafter rapidly discharging the capacitor.

4. A high voltage heavy current impulse generator comprising a plurality of electric capacitors each having a volume efficiency of at least 85 joules/litre and of which the conductive elements are insulated with kraft paper impregnated with castor oil, means for regularly and repeatedly feeding direct current to charge the capacitor in a period in the range 2 seconds to 2 minutes, to a peak voltage at which the capacitor insulation is subjected to an electrical stress of at least 85 volts per micron, and means for regularly and repeatedly permitting the capacitor to discharge, within a period in the range 10 milliseconds to 1 microsecond, on becoming charged to the peak voltage.

5. A method of regularly and repeatedly generating a high voltage heavy current impulse, comprising alternately slowly charging each capacitor of a bank of a plurality of castor oil impregnated kraft paper insulated electrical capacitors each having a volume efficiency of at least 85 joules/litre, from a source of direct current supply, in a period in the range of 2 seconds to 2 minutes, to a peak voltage at which the insulation of each capacitor is subjected to an electrical stress of at least 85 volts per micron, and thereafter rapidly discharging the bank of capacitors within a period in the range 10 milliseconds to 1 microsecond.

References Cited in the file of this patent

UNITED STATES PATENTS

| | | |
|---|---|---|
| 2,235,566 | Ruben | Mar. 18, 1941 |
| 2,659,854 | Wengel | Nov. 17, 1953 |
| 2,745,052 | Willemse | May 8, 1956 |
| 2,823,319 | Vossberg | Feb. 11, 1958 |

FOREIGN PATENTS

| | | |
|---|---|---|
| 232,920 | Great Britain | Sept. 10, 1925 |